US009759918B2

(12) United States Patent
Ebstyne et al.

(10) Patent No.: US 9,759,918 B2
(45) Date of Patent: Sep. 12, 2017

(54) 3D MAPPING WITH FLEXIBLE CAMERA RIG

(71) Applicant: Microsoft Technology Licensing, LLC, Redmond, WA (US)

(72) Inventors: Michael John Ebstyne, Seattle, WA (US); Frederik Schaffalitzky, Bellevue, WA (US); Drew Steedly, Redmond, WA (US); Georg Klein, Seattle, WA (US); Ethan Eade, Seattle, WA (US); Michael Grabner, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 196 days.

(21) Appl. No.: 14/267,714

(22) Filed: May 1, 2014

(65) Prior Publication Data

US 2015/0316767 A1    Nov. 5, 2015

(51) Int. Cl.
  *G02B 27/01*    (2006.01)
  *G06F 3/01*    (2006.01)
  *G06T 7/80*    (2017.01)

(52) U.S. Cl.
  CPC ....... *G02B 27/0172* (2013.01); *G02B 27/017* (2013.01); *G06F 3/012* (2013.01); *G06F 3/017* (2013.01); *G06T 7/80* (2017.01); *G06T 7/85* (2017.01); *G02B 2027/0178* (2013.01); *G06T 2207/10012* (2013.01); *G06T 2207/10028* (2013.01); *G06T 2207/30204* (2013.01)

(58) Field of Classification Search
  CPC .............. G02B 27/0172; G02B 27/017; G02B 2027/0178; G06T 7/0018; G06F 3/012
  See application file for complete search history.

(56) References Cited

U.S. PATENT DOCUMENTS

| | | | | |
|---|---|---|---|---|
| 8,576,143 | B1 * | 11/2013 | Kelly | G02B 27/017 345/8 |
| 9,210,401 | B2 * | 12/2015 | Wilson | H04N 9/3147 |
| 9,242,171 | B2 * | 1/2016 | Newcombe | G06T 7/2046 |
| 2004/0105573 | A1 * | 6/2004 | Neumann | G06T 17/00 382/103 |
| 2006/0028400 | A1 | 2/2006 | Lapstun et al. | |
| 2008/0091373 | A1 | 4/2008 | McGibbon et al. | |
| 2011/0234879 | A1 | 9/2011 | Kashitani | |
| 2012/0275667 | A1 | 11/2012 | Lu | |
| 2013/0120224 | A1 | 5/2013 | Cajigas et al. | |
| 2013/0131985 | A1 | 5/2013 | Weiland et al. | |

(Continued)

OTHER PUBLICATIONS

Davison, A., "Real-time Simultaneous Localisation and Mapping with a Single Camera," Ninth IEEE International Conference on Computer Vision, vol. 2, Oct. 13, 2003, 8 Pages.

(Continued)

*Primary Examiner* — Abbas Abdulselam
(74) *Attorney, Agent, or Firm* — Alleman Hall Creasman & Tuttle LLP (57) ABSTRACT

Embodiments related to mapping an environment of a machine-vision system are disclosed. For example, one disclosed method includes acquiring image data resolving one or more reference features of an environment and computing a parameter value based on the image data, wherein the parameter value is responsive to physical deformation of the machine-vision system.

17 Claims, 6 Drawing Sheets

(56) References Cited

U.S. PATENT DOCUMENTS

| | | | | |
|---|---|---|---|---|
| 2015/0012426 | A1* | 1/2015 | Purves | G06Q 30/0623 |
| | | | | 705/41 |
| 2015/0243068 | A1* | 8/2015 | Solomon | G02B 27/017 |
| | | | | 345/419 |
| 2016/0033771 | A1* | 2/2016 | Tremblay | G02B 27/0172 |
| | | | | 345/8 |

OTHER PUBLICATIONS

Achtelik, M. et al., "Collaborative Stereo," 2011 IEEE/RSJ International Conference on Intelligent Robots and Systems, Sep. 25, 2011, 7 pages.
ISA European Patent Office, International Search Report and Written Opinion Issued in Application No. PCT/US2015/027858, Jul. 24, 2015, WIPO, 14 Pages.
Carrera, et al., "SLAM-Based Automatic Extrinsic Calibration of a Multi-Camera Rig", In IEEE International Conference on Robotics and Automation, May 9, 2011, 8 pages.
Kuster, et al., "FreeCam: A Hybrid Camera System for Interactive Free-Viewpoint Video", In Vision, Modeling, and Visualization, Oct. 4, 2011, 8 pages.
Kim, et al., "Design and Calibration of a Multi-view TOF Sensor Fusion System", In IEEE Computer Society Conference on Computer Vision and Pattern Recognition Workshops, Jun. 23, 2008, 7 pages.
Clipp, Brian Sanderson, "Multi-Camera Simultaneous Localization and Mapping", Published on: Sep. 30, 2011, Available at: http://www.cs.unc.edu/cms/publications/dissertations/clipp.pdf.
Sola, Joan, "Multi-camera VSLAM: from Former Information Losses to Self-Calibration", In International Conference on Intelligent Robots and Systems, Oct. 29, 2007, 7 pages.
Santoro, et al., "Misalignment Correction for Depth Estimation using Stereoscopic 3-D Cameras", In IEEE International Conference on Robotics and Automation, May 9, 2011, 6 pages.
Gilson, et al., "Spatial Calibration of an Optical see-through Head Mounted Display", In Journal of Neuroscience Methods, vol. 173, Issue 1, May 21, 2008, 25 pages.
Kelly, et al., "Visual-Inertial Simultaneous Localization, Mapping and Sensor-to-Sensor Self-Calibration", In IEEE International Symposium on Computational Intelligence in Robotics and Automation, Dec. 15, 2009, 9 pages.
Genc, et al., "Optical See-Through HMD Calibration: A Stereo Method Validated with a Video See-Through System", In IEEE and ACM International Symposium on Augmented Reality, Oct. 5, 2000, 10 pages.
Sola, et al., "Fusing Monocular Information in Multicamera SLAM", In IEEE Transactions on Robotics, vol. 24, Issue 5, Oct., 2008, 11 pages.
Baar, et al., "Sensor Fusion for Depth Estimation, including TOF and Thermal Sensors", In Proceedings of Second Joint 3DIM/3DPVT Conference: 3D Imaging, Modeling, Processing, Visualization & Transmission, Oct. 13, 2012, 7 pages.
Saxena, et al., "Depth Estimation using Monocular and Stereo Cues", In International Joint Conference on Artificial Intelligence, Jan. 6, 2007, 7 pages.
Mitchelson, et al.,"Wand-based Multiple Camera Studio Calibration", In CVSSP Technical Report, Feb. 2003, 30 pages.
Bergh, et al.,"Combining RGB and ToF Cameras for Real-time 3D Hand Gesture Interaction", In IEEE Workshop on Applications of Computer Vision, Jan. 5, 2011, 7 pages.
Klein, et al., "Parallel Tracking and Mapping for Small AR Workspaces", in Mixed and Augmented Reality, 2007. ISMAR 2007. 6th IEEE and ACM International Symposium; retreived from http://www.robots.ox.ac.uk/~gk/publications/KleinMurray2007ISMAR.pdf, Nov. 13-16, 2007, 10 pages.
IPEA European Patent Office, Second Written Opinion issued in Application No. PCT/US2015/027858, Mar. 21, 2016, WIPO, 9 pages.
IPEA European Patent Office, International Preliminary Report on Patentability Issued in Application No. PCT/US2015/027858, Jul. 14, 2016, WIPO, 9 Pages.

\* cited by examiner

3D MAPPING WITH FLEXIBLE CAMERA RIG

BACKGROUND

Machine-vision technology has undergone rapid development in recent years. Using stereo vision, for example, a machine-vision system may be used to create a three-dimensional (3D) map of its environment. If portable or otherwise non-stationary, a machine-vision system may support 'simultaneous location and mapping' (SLAM). In this approach, the machine-vision system travels an arbitrary path, mapping the environment from different perspectives while tracking its own position and orientation.

SUMMARY

Embodiments are disclosed that relate to mapping of an environment via a machine-vision system. For example, one disclosed embodiment provides a method including acquiring image data resolving one or more reference features of an environment and computing a parameter value based on the image data, wherein the parameter value is responsive to physical deformation of the machine-vision system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

For reliable SLAM execution, fields of view of each camera of a machine-vision system should map accurately to the coordinate system of the environment. The required accuracy may be achievable using cameras coupled to a rigid rig, provided the rig itself has a discoverable orientation with respect to the environment. However, a rigid camera rig may be impractical in wearable machine-vision systems made for the consumer market. Here, the suitability of a machine-vision system may be affected by its cost, weight, and aesthetics.

Accordingly, embodiments are disclosed herein that may help to improve the accuracy of SLAM for systems having a non-rigid camera rig. In this approach, one or more parameter values are computed based on the image data acquired by the machine-vision system. These parameters are responsive to physical deformation (twisting, bending, etc.) of the camera rig. In executing SLAM, the parameter values determine the relative fields of view of the cameras, which in turn determines how coordinates are assigned to the various features of the environment.

Figure 1:
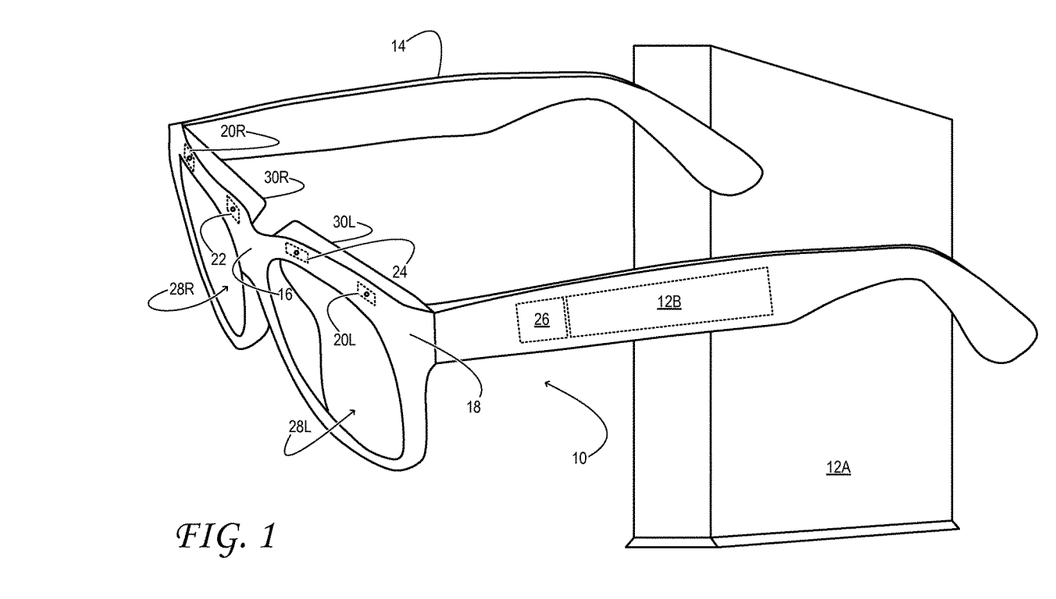
FIG. 1 shows aspects of a wearable machine-vision system and a computer system in accordance with an embodiment of this disclosure.

Prior to discussing these embodiments in detail, an example machine vision system is described with reference to FIGS. 1 and 2. First, FIG. 1 shows aspects of a wearable machine-vision system 10 operatively coupled to a computer system 12A via a suitable wired or wireless connection (not shown). The depicted machine-vision system 10 takes the form of eyewear, and includes an ear-fitting frame 14 with a nose bridge 16 to be positioned on the wearer's face. In the illustrated embodiment, the front portion of the frame serves as a rig 18, which supports various system components, including sensory components. In particular, the rig supports right and left stereo cameras 20R and 20L. Further, some embodiments may additionally or alternatively include a depth camera 22, and a near-infrared (NIR) emitter 24 associated with the depth camera. Where both stereo and depth cameras are included, the depth camera and the stereo cameras have mutually overlapping fields of view.

In one embodiment, each stereo camera 20 is a digital color camera configured to acquire a sequence of images in the field of view of the wearer—i.e., the scene in front of the wearer. Stereoscopically oriented, these cameras may be triggered to acquire stereoscopically related image pairs. Based on the image pairs, a topology of the scene or a portion thereof may be computed via downstream processing, as described below.

Depth camera 22 may include an imaging system configured to acquire a sequence of depth maps of the scene in front of the wearer. As used herein, the term 'depth map' refers to an array of pixels registered to corresponding regions $(X_i, Y_i)$ of an imaged subject, with a depth value $Z_i$ indicating, for each pixel, the depth of the corresponding region. 'Depth' may be defined, for example, as a coordinate parallel to the optical axis of the depth camera, which increases with increasing distance from the depth camera.

The nature of depth camera 22 may differ in the various embodiments. In one embodiment, a depth camera may be configured to project a structured infrared (IR) or near-infrared (NIR) illumination pattern comprising numerous discrete features—e.g., lines or dots. An imaging array in the depth camera may be configured to image the structured illumination reflected back from the subject. Based on the spacings between adjacent features in the various regions of the imaged subject, a depth map of the subject may be constructed. In other embodiments, the depth camera may project a pulsed IR or NIR illumination towards the subject. A pair of imaging arrays in the depth camera may be configured to detect the pulsed illumination reflected back from the subject. Both arrays may include an electronic shutter synchronized to the pulsed illumination, but the integration times for the arrays may differ, so that a pixel-resolved time-of-flight of the pulsed illumination, from the illumination source to the subject and then to the arrays, is discernible based on the relative amounts of light received in corresponding elements of the two arrays.

Continuing in FIG. 1, the machine-vision system 10 further includes a microcontroller 12B. In some embodiments, the microcontroller may be concealed within frame 14. The microcontroller may include logic and memory to process the image data from stereo cameras 20 and from depth camera 22. In some embodiments, such processing may be carried out remotely—e.g., in computer system 12A or on a network connected to the computer system.

In the embodiment of FIG. 1, microcontroller 12B is operatively coupled to an inertial measurement unit (IMU) 26. The IMU may include an accelerometer and/or gyroscopic sensor responsive to orientation and/or a change in velocity. Thus, the IMU may be configured to detect the orientation of machine-vision system 10, and/or to sense a movement of the machine-vision system relative to its environment. In some embodiments, a global positioning system (GPS) receiver may be included in machine-vision system 10 and used instead of, or in addition to the IMU. Naturally, in embodiments in which the machine-vision system is wearable, the position and orientation of the machine-vision system may be used as surrogates for the position and orientation of the wearer, the wearer's head, etc.

In the embodiment of FIG. 1, machine-vision system 10 includes integrated display componentry. In particular, the machine-vision system includes a right display window 28R, a left display window 28L, and associated near-eye display projectors 30R and 30L. Like microcontroller 12B, the display projectors may be concealed within frame 14 and/or coupled to rig 18. In some embodiments, the right and left display windows 28 are wholly or partly transparent from the perspective of the wearer, to give the wearer a clear view of his or her surroundings. This feature enables computerized display imagery to be admixed with imagery from the surroundings, which may be referred to as 'augmented reality' (AR).

In the embodiment of FIG. 1, display imagery may be transmitted in real time to microcontroller 12B from computer system 12A. The display imagery may be transmitted in any suitable form—viz., type of transmission signal, data structure, protocol, etc.—and the signal encoding the display imagery may be carried over a wired or wireless communication link of any kind. When the integrated display componentry is in operation, microcontroller 12B sends appropriate control signals to right display projector 30R, which cause the right display projector to form a right display image in right display window 28R. Likewise, the microcontroller sends appropriate control signals to left display projector 30L which cause the left display projector to form a left display image in left display window 28L. When the right and left display images are appropriately composed and presented, the wearer may experience the perception of a virtual object at a specified position, having specified 3D content and other display properties.

Figure 2:
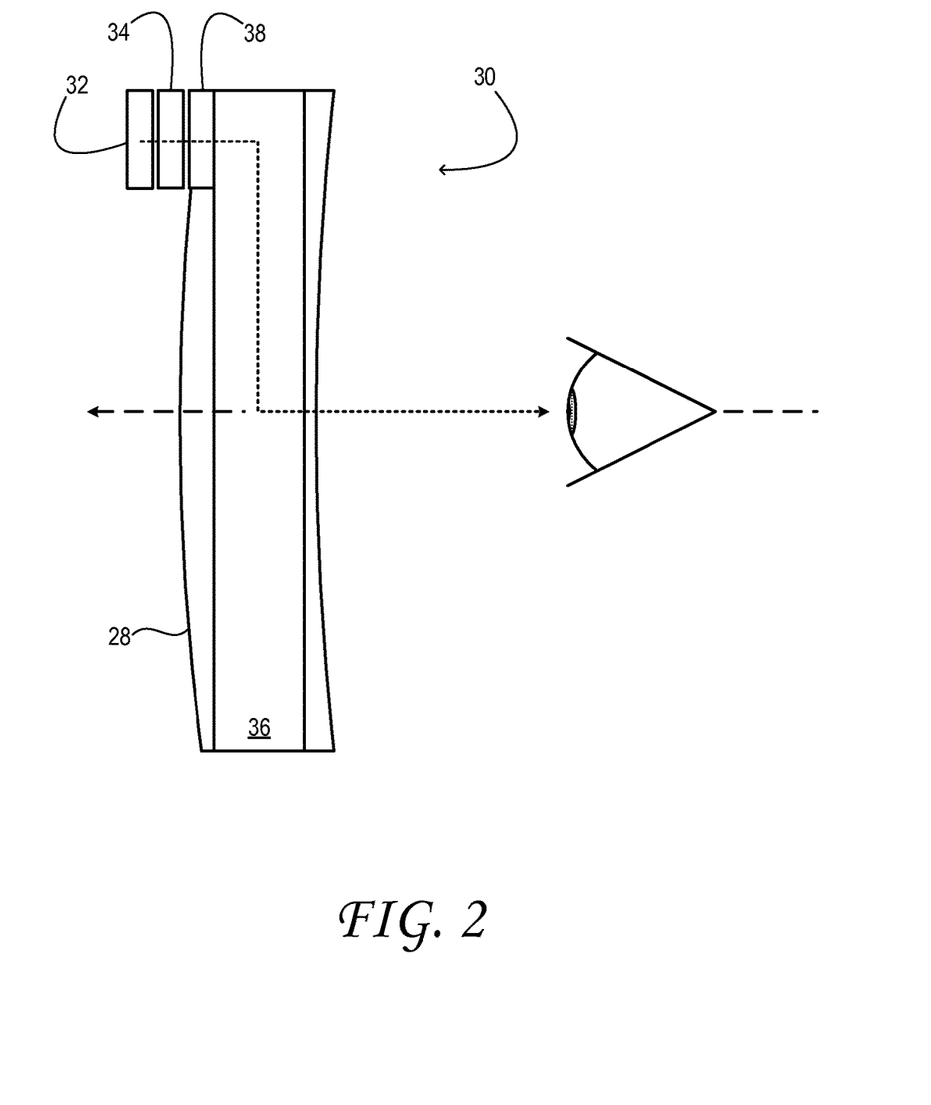
FIG. 2 shows aspects of a display projector and associated display window in accordance with an embodiment of this disclosure.

FIG. 2 shows aspects of right or left display projector 30 and an associated display window 28 in one, non-limiting embodiment. The display projector includes a backlight 32 and a liquid-crystal display (LCD) array 34. The backlight may include an ensemble of light-emitting diodes (LEDs)— e.g., white LEDs or a distribution of red, green, and blue LEDs. The backlight may be situated to direct its emission through the LCD array, which is configured to form a display image based on the control signals from microcontroller 12B. The LCD array may be a liquid-crystal-on-silicon (LCOS) array in one embodiment. In other embodiments, a digital micromirror array may be used in lieu of the LCD array, or an active-matrix LED array may be used instead. In still other embodiments, scanned-beam technology may be used to form the display image.

In FIG. 2, the display image from LCD array 34 is received into a vertical pupil expander 36. The vertical pupil expander lowers the display image into the wearer's field of view, and in doing so, expands the exit pupil of the display image in the vertical direction. From vertical pupil expander 36, the display image is received into a horizontal pupil expander, which may be coupled into or embodied as display window 28. In other embodiments, the horizontal pupil expander may be distinct from the display window. Either way, the horizontal pupil expander expands the exit pupil of the display image in the horizontal direction. By passing through the horizontal and vertical pupil expanders, the display image is presented over an area that substantially covers the eye. This enables the wearer to see the display image over a suitable range of horizontal and vertical offsets between the display projector and the eye.

In some embodiments, display projector 30 may apply optical power to the display image from LCD array 34, in order to adjust the vergence of the display image. Such optical power may be provided by the vertical or horizontal pupil expanders, or by lens 38, which couples the display image from the LCD array into the vertical pupil expander. If light rays emerge convergent or divergent from the LCD array, for example, the display projector may reverse the image vergence so that the light rays are received collimated into the wearer's eye. This tactic can be used to form a display image of a far-away virtual object. Likewise, the display projector may be configured to impart a fixed or adjustable divergence to the display image, consistent with a virtual object positioned a finite distance in front of the wearer. In some embodiments, where lens 38 is an electronically tunable lens, the vergence of the display image may be adjusted dynamically based on a specified distance between the observer and the virtual object being displayed.

The wearer's perception of distance to a virtual display object is affected not only by display-image vergence but also by positional disparity between the right and left display images. Accordingly, each pixel of the right and left display images may be shifted by an appropriate amount horizontally to simulate the visual effect of a virtual object with a specified 3D contour, positioned an appropriate distance from the wearer. The virtual object so formed may be an object of any desired complexity, and may comprise more than one separate displayed object. Rather, the virtual object may comprise a complete virtual scene having both foreground and background portions.

In the manner described above, the integrated display componentry of machine-vision system 10 supports some aspects of an AR experience. However, a holistic AR experience also may involve registering various features of the real-world environment on a virtual map, and determining a position and orientation of the machine-vision system on the map to position virtual imagery appropriately within the environment.

An approach called 'simultaneous location and mapping' (SLAM) is one way to achieve this result. SLAM recognizes the technical difficulty of creating a virtual map based on sensory output while concertedly determining sensor position and orientation within that map, in cases where the sensory output is corrupted by noise. SLAM therefore enacts the two component tasks via separate processing threads, but binds them temporally in a loop, to yield an overall coherent map of the environment together with the position and orientation of the sensor within the environment. In one implementation of SLAM, image data is acquired from one or more sensors that move within the environment. Fixed reference features of the environment are located in multiple frames of the image data. The positions of the reference features in the multiple frames are then correlated so as to map the reference features, and the image space between them, onto a common coordinate system.

Despite the utility of the SLAM approach, this disclosure is not limited to SLAM, but also may apply to any mapping and location process in which uncertainty in the position or orientation of one sensor with respect to another (or to a frame of reference fixed to the machine-vision system) may be a significant noise source.

Various types of sensors may be used to map an environment and determine position and orientation within that environment, including but not limited to imaging sensors such as stereo and depth cameras, as well as non-imaging sensors such as an IMU or GPS. In some embodiments, output from multiple sensors is processed together—contemporaneous output from right and left stereo cameras 20, for example—which sight the same reference feature. In some embodiments, sensory data from other imaging sensors—additional color cameras and/or a depth camera, for example—may be included as well. In these and other embodiments, output from non-imaging sensors may be incorporated to better establish the position and orientation of the imaging sensors within the environment. In many cases, the uncertainties of each type of sensor output is known or discoverable. Accordingly, the various sensory outputs may be weighted appropriately in whatever approach is used to enact the mapping and location functions.

One potential difficulty of using SLAM in a consumer AR application will now be described with further reference to FIG. 1. The reader will again note that the right and left stereo cameras 20 and the depth camera 22 of machine-vision system 10 are mechanically coupled to rig 18. In a hypothetical case in which the rig is perfectly rigid, the field of view of each of these cameras is related to the field of view of any other by translation, rotation, and scaling operations which are invariant over time. As such, an initial calibration is sufficient to allow image data from two or more cameras to be used together.

However, a machine-vision system marketed for the consumer may be made from more flexible materials, such as plastic or thin pieces of metal, to have less structural bulk. The structure of such a device may not be perfectly rigid, but instead may flex somewhat during use—e.g., when the user adjusts or otherwise touches it, makes a facial gesture, or even makes a chewing movement. Such flexing imparts uncertainty in the positions and orientations of the cameras with respect to each other and to any frame of reference fixed to the machine-vision system. Accordingly, if a model is used that assumes the camera positions and orientations are invariant from frame to frame, then the location and mapping functions of SLAM may become unreliable, possibly impacting a user experience. Depth-sensing error from stereo cameras 20 may be especially great when flexing misaligns the stereo cameras. Here, a misalignment of less than one degree may cause an uncertainty of several centimeters in perception of an object's depth.

Thus, the disclosed embodiments may allow the camera positions and orientations to vary from frame to frame by modeling deformations of the rig to which the cameras are attached. As such, instead of using six degrees of freedom to describe the position and orientation of machine-vision system 10 as a whole, each individual camera may have as many as six variable degrees of freedom taken into consideration each frame. As modeling six degrees of freedom may be computationally intensive, the positions and orientations of the cameras may be constrained in some embodiments, such that they vary according to a physically realistic model while simplifying calculations compared to modeling six degrees of freedom independently.

Rig deformations may be modeled in any suitable manner. For example, in some embodiments, a model may be utilized in which the cameras are rigidly attached to the rig, but the rig itself is prone to deformation along various deformation modes. Such modes may include stretches, twists, and bends, for example. In some embodiments, a model may include dozens of independent deformation modes. In other embodiments, a simplified model may be used which represents those modes believed to significantly affect camera alignment, and not modes believed to have less of an effect on camera alignment.

Figure 3:
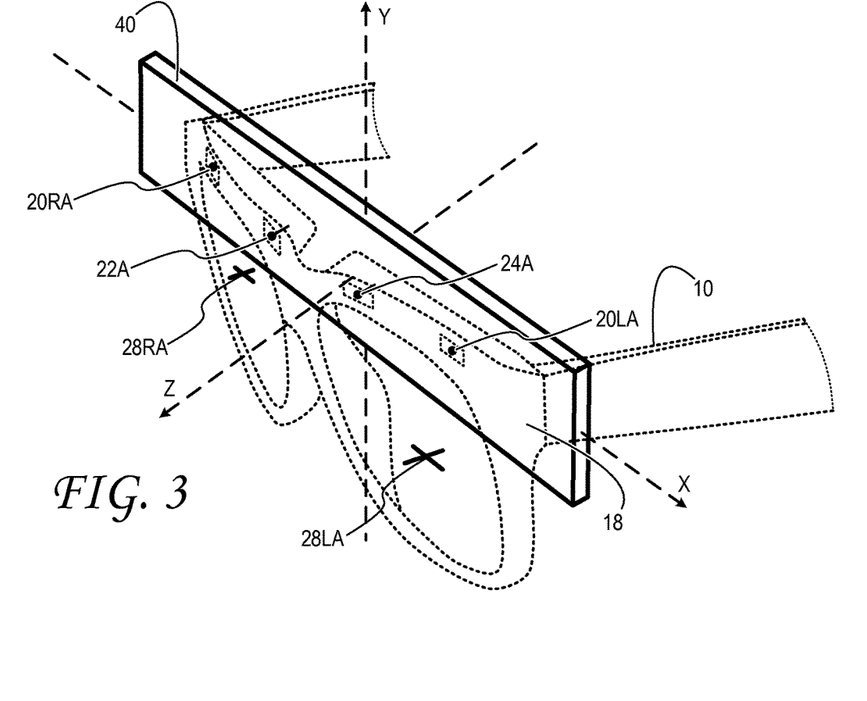
FIGS. 3-6 illustrate aspects of a mathematical model describing deformation of a machine-vision system in accordance with an embodiment of this disclosure.

FIGS. 3-6 show aspects of an example of a rig deformation model. First, FIG. 3 shows the superposition of rig 18 of machine-vision system 10 and a virtual elastic beam 40, which serves to model the rig. The beam is aligned along an axis labeled X in FIGS. 3-6, which is designated the twist axis. In this model, each component coupled to rig 18 in machine-vision system 20 is assumed to be rigidly fixed to beam 40 at a corresponding position—i.e., distance along twist axis X and orthogonal axes Y and Z. In the illustrated embodiment, such components include stereo cameras 20, depth camera 22, NIR illuminator 24, and display windows 28. In FIGS. 3-6, the aperture corresponding to each of these components is provided a corresponding label: 22A for the depth camera, 24A for the illuminator, etc.

Figure 4:
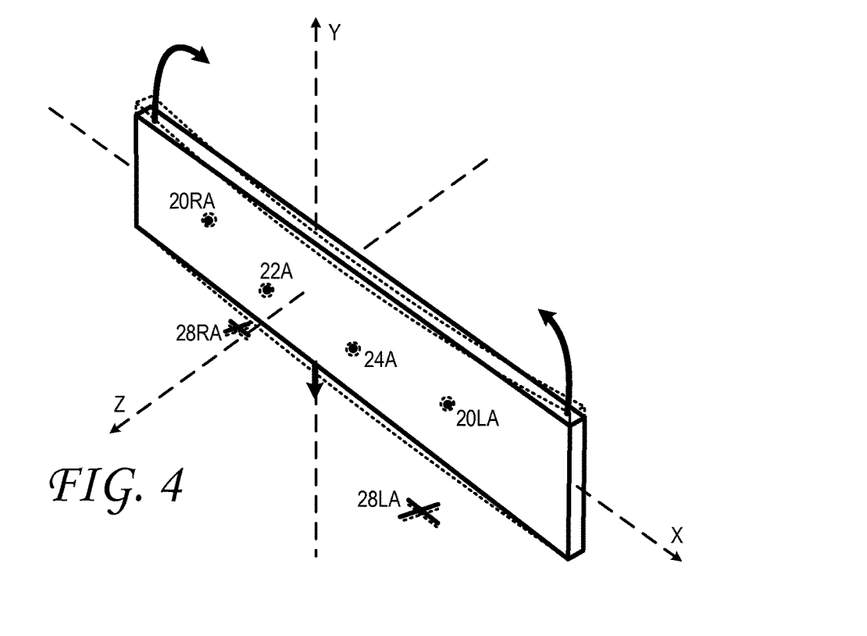
Figure 5:
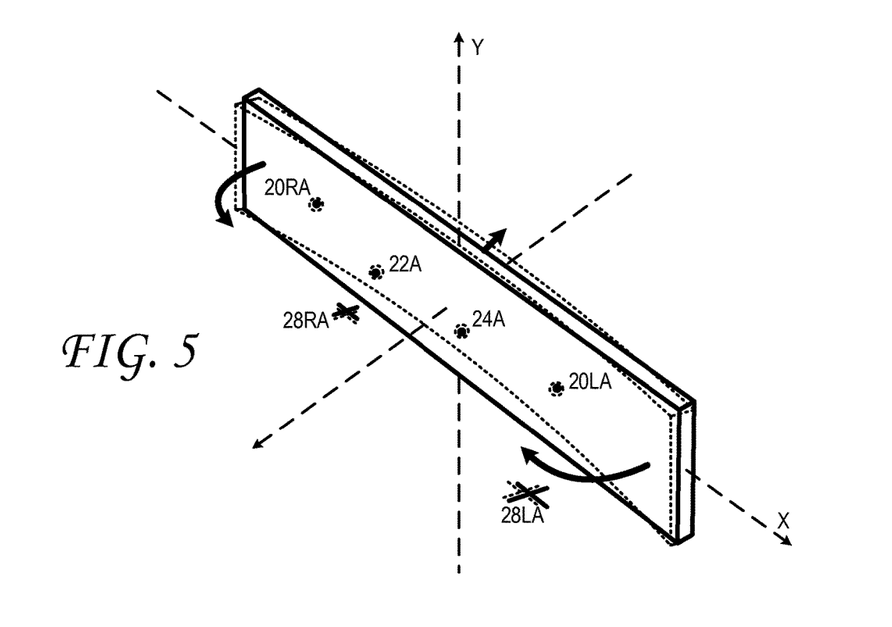
Figure 6:
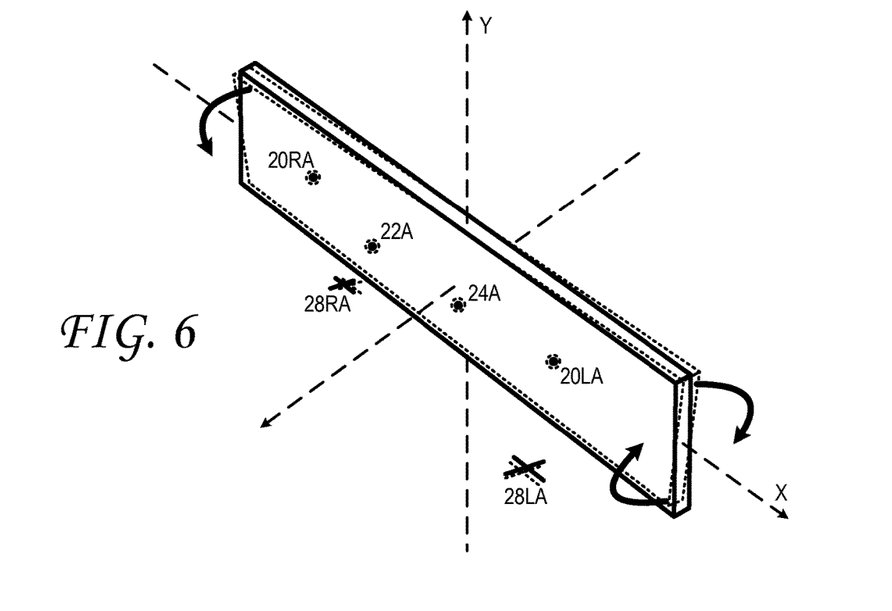

Although each component is assumed to be rigidly attached to beam 40, the beam itself is assumed to be deformable along three deformation modes, which include a twist about the twist axis X and orthogonal bending modes from planes that include the twist axis and each of the orthogonal axes. FIG. 4 illustrates one of the bending modes and its effect on the aperture positions of the various components coupled to the rig. FIG. 5 illustrates the other bending mode, and FIG. 6 illustrates the twist. According to this model, the shape of beam 40 at any point in time is a function of three independently variable, signed parameters: $T_x(t)$, which describes the extent of the twist; $B_y(t)$ which describes the extent of the bend of FIG. 4, and $B_z(t)$ which describes the extent of the bend of FIG. 5. Because each component aperture resides at a known position on or from the beam—i.e., at fixed offsets relative to a frame of reference of the beam—the positions of the apertures can be computed at any point in time based on the parameter values $T_x(t)$, $B_y(t)$, and $B_z(t)$. In like manner, the optical axis and field of view of each camera may be computed as well.

In one embodiment, a suitable location and mapping algorithm (e.g., SLAM) is enacted to allow parameters $T_x(t)$, $B_y(t)$, and $B_z(t)$ to float within physically realistic constraints. These deformation parameters are adjusted along with the canonical SLAM parameters to minimize the various observation deltas in the SLAM algorithm.

No aspect of the foregoing description or drawings should be interpreted in a limiting sense, for numerous other variants lie within the spirit and scope of this disclosure. For instance, although the drawings show two stereo cameras 20 and a depth camera 22 with mutually overlapping fields of view, other embodiments may include more or fewer cameras. At least one of the cameras may provide a field of view different than the others. Further, in some embodiments, no two cameras may share an overlapping field of view. Instead of correlating a given reference feature from concurrent image frames of different cameras, reference features from image frames acquired at different times may be correlated. Furthermore, although TOF and structured-light depth sensing is less affected by rig deformation than stereo vision (because the scale of the depth measurement does not change with camera orientation), a TOF or structured-light depth camera is not required to achieve the desired results. As for the deformation model described and illustrated herein, it will be understood that this model is provided only by way of example, and that other models may be used instead. Alternative models may include more or fewer deformation modes (as few as one), and/or different deformation modes, such as a rig-stretching mode.

The configurations described above enable various methods to map an environment using a machine-vision system and to determine the position and orientation of the machine-vision system within the environment. Some such methods are now described, by way of example, with continued reference to the above configurations. It will be understood, however, that the methods here described, and others within the scope of this disclosure, may be enabled by different configurations as well.

Figure 7:
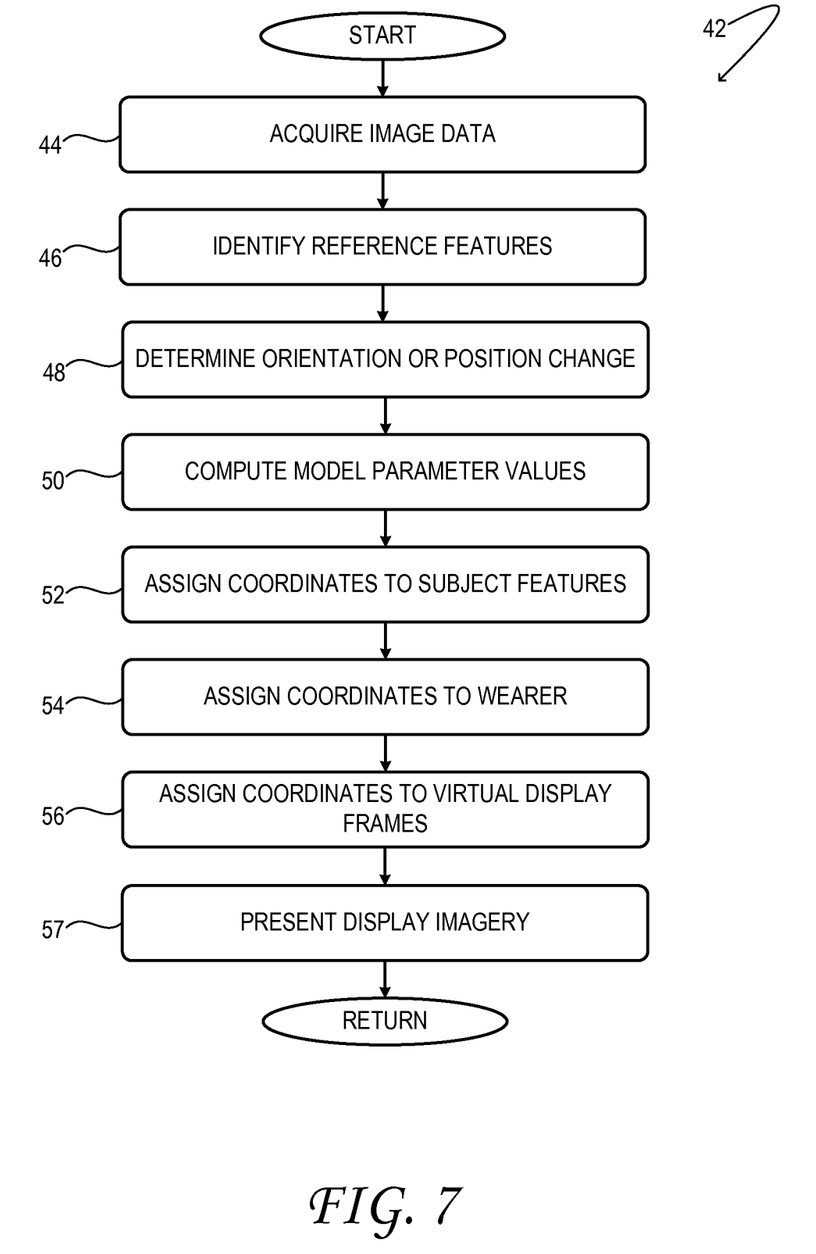
FIG. 7 illustrates a method to map an environment in accordance with an embodiment of this disclosure.

FIG. 7 illustrates an example embodiment of a method of location and mapping via a machine vision system. The method may be enacted, for example, via a microcontroller of a machine-vision system, wearable or otherwise. In some embodiments, aspects of the method may be enacted in a computer system external to the machine-vision system but operatively coupled to the microcontroller.

At 44 of method 42, image data is acquired from one or more imaging sensors—e.g., stereo and/or depth cameras—of the machine-vision system. In such data, one or more reference features of the environment may be resolved. A reference feature may be a feature having an easily recognizable geometry, so that the same feature can be recognized across a plurality of image frames. In some scenarios, the reference features may be corner features or features of high curvature in the environment. Examples of such features may include, but are not limited to, corners of rectangular structures such as walls, doorways, and box-like objects, objects of any geometry that jut out from an otherwise flat surface, etc. At 46, the one or more reference features is identified in a plurality of image frames from the machine-vision system. In one embodiment, a given reference feature may be identified in different frames from the same camera. In another embodiment, a given reference feature may be identified in frames from different cameras.

At 48 an IMU or GPS receiver of the machine-vision system is read to provide information on the orientation of the machine-vision system or a change in position of the machine-vision system.

At 50, one or more parameter values are computed based on the image data. In the embodiments here contemplated, each of the parameter values change in magnitude and/or direction with changing physical deformation of the machine-vision system. As such, the parameter values as computed may be based upon a state of physical deformation of the machine vision system. In some scenarios, the deformation may reorient a field of view of one or more cameras of the machine-vision system. Further, each parameter value computed at 50 may be associated with deformation of the machine-vision system along a different deformation mode. As described hereinabove, at least one of the parameter values may be responsive to a twist of the machine-vision system about an axis of the machine-vision system. As another example, at least one of the parameter values may be responsive to a bend of the machine vision system about a fixed point on the machine-vision system.

As noted above, the act of computing the parameter values may occur in the context of executing a SLAM algorithm, and may include locating the one or more reference features (from 46) in concurrent image frames acquired by the machine-vision system—e.g., by different cameras. In this and other embodiments, the act of computing the parameter values may include locating the one or more reference features in image frames acquired a different times by the machine-vision system—e.g., by the same camera—and conducting, for example, a minimization or other suitable procedure to align the corresponding reference features, in view of the changing overall position and/or orientation of the machine-vision system between frames. In one embodiment, the parameter values may be computed at regular intervals during acquisition of the image data. For instance, the parameter values may be updated each time an image frame is acquired, updated every tenth image frame, etc.

At 52, coordinates are assigned to one or more subject features in the environment based on the computed parameter values. At least some of the subject features may also be resolved in the image data acquired at 44 and may include any or all of the reference features referred to hereinabove. Due to the fact that the modeled camera positions and orientations are subject to adjustment during the location and mapping procedure, the assigned coordinates of the one or more subject features may be invariant to flexing of the machine-vision system in real time.

At 54, additional coordinates are assigned based on the computed parameter values. These coordinates specify a position and orientation of the machine-vision system within the environment (or equivalently, of the wearer of the machine-vision system, the head of the wearer, etc.) In one embodiment, a set of coordinates may include Cartesian coordinates $X_0, Y_0, Z_0$, in addition to three angles to specify orientation. In one embodiment, such coordinates may be assigned relative to the same frame of reference on which the subject features were mapped.

At 56, additional coordinates are assigned based on the computed parameter values. These coordinates specify the positions of the virtual display frames of the near-eye display projectors coupled to the machine-vision system. This feature, where included, enables the positional disparity between right and left image frames to be maintained for virtual object display despite flexing of the rig. Further, At 57, virtual display imagery is transmitted to the display projectors of the machine-vision system based on the coordinates assigned to the virtual display frames. In other words, the virtual display imagery may be shifted to compensate for any movement of the physical display windows, which may occur due to the flexing of the rig.

As described above, the methods and processes described herein may be tied to a computing system of one or more computing machines. Such methods and processes may be implemented as a computer-application program or service, an application-programming interface (API), a library, and/or other computer-program product.

Figure 8:
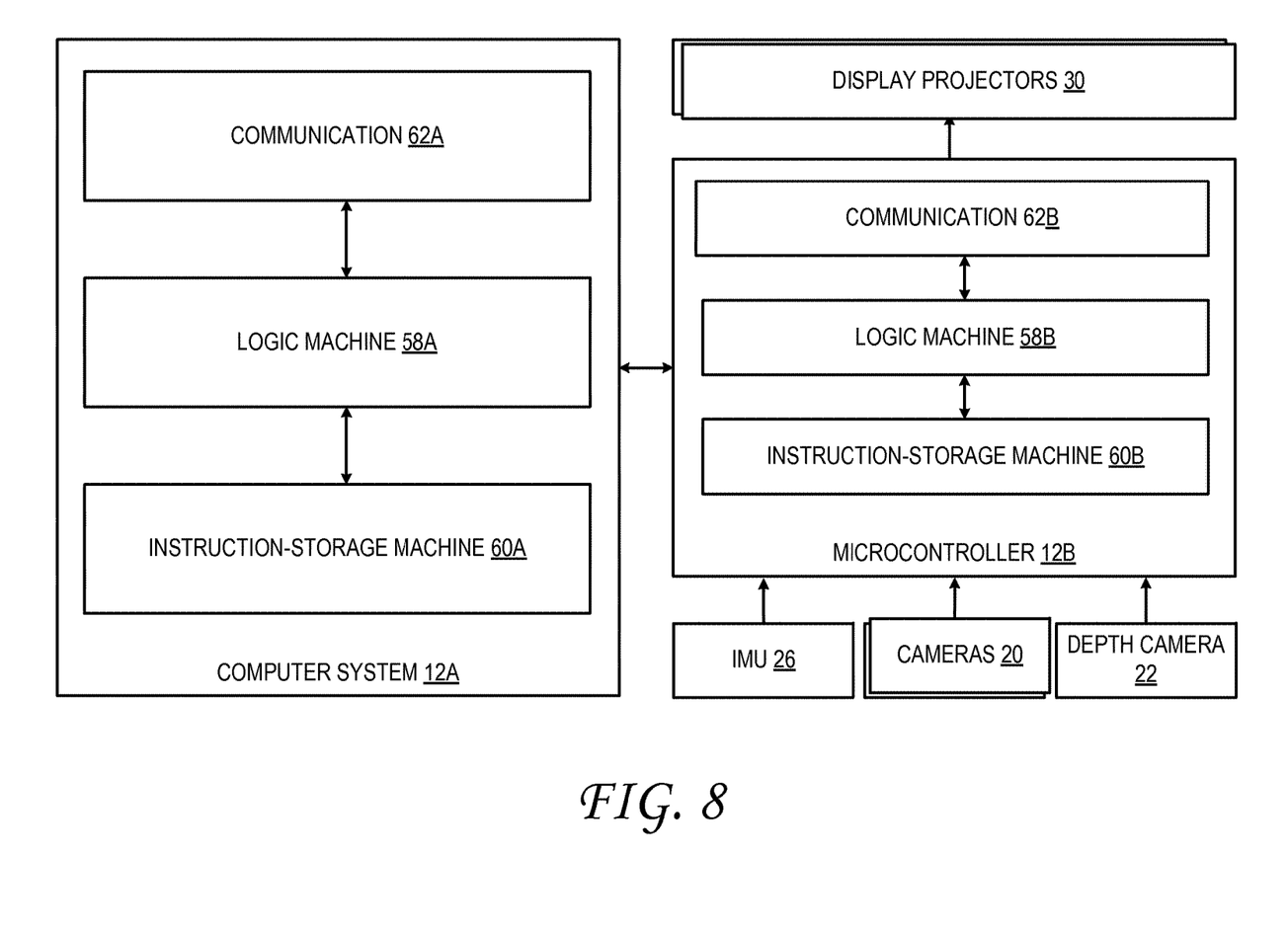
FIG. 8 shows aspects of an example computing system in accordance with an embodiment of this disclosure.

Shown in FIG. 8 in simplified form is a non-limiting example of a computing system used to support the methods and processes described herein. The computing system includes aspects computer system 12A and microcontroller 12B. Each computing machine 12 includes a logic machine 58 and an instruction-storage machine 60. The computing system also includes a display in the form of display projectors 30, communication systems 62, and various components not shown in FIG. 8. It will be understood that FIG. 8 and/or aspects thereof also may represent any other suitable computing system used to implement any of the embodiments described herein.

Each logic machine 58 includes one or more physical devices configured to execute instructions. For example, a logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Each logic machine 58 may include one or more processors configured to execute software instructions. Additionally or alternatively, a logic machine may include one or more hardware or firmware logic machines configured to execute hardware or firmware instructions. Processors of a logic machine may be single-core or multi-core, and the instructions executed thereon may be configured for sequential, parallel, and/or distributed processing. Individual components of a logic machine optionally may be distributed among two or more separate devices, which may be remotely located and/or configured for coordinated processing. Aspects of a logic machine may be virtualized and executed by remotely accessible, networked computing devices configured in a cloud-computing configuration.

Each instruction-storage machine 60 includes one or more physical devices configured to hold instructions executable by an associated logic machine 58 to implement the methods and processes described herein. When such methods and processes are implemented, the state of the instruction-storage machine may be transformed—e.g., to hold different data. An instruction-storage machine may include removable and/or built-in devices; it may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. An instruction-storage machine may include volatile, nonvolatile, dynamic, static, read/write, read-only, random-access, sequential-access, location-addressable, file-addressable, and/or content-addressable devices. In some embodiments, a storage machine may reside on a network to provide persistent storage of data and/or code.

It will be appreciated that each instruction-storage machine 60 includes one or more physical devices. However, aspects of the instructions described herein alternatively may be propagated by a communication medium (e.g., an electromagnetic signal, an optical signal, etc.), as opposed to being stored on a storage medium.

Aspects of a logic machine 58 and instruction-storage machine 60 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term 'program' may be used to describe an aspect of a computing system implemented to perform a particular function. In some cases, a program may be instantiated via a logic machine 58 executing instructions held by an instruction-storage machine 60. It will be understood that different programs may be instantiated from the same application, service, code block, object, library, routine, API, function, etc. Likewise, the same program may be instantiated by different applications, services, code blocks, objects, routines, APIs, functions, etc. The term 'program' may encompass individual or groups of executable files, data files, libraries, drivers, scripts, database records, etc.

It will be appreciated that a 'service', as used herein, is an application program executable across multiple user sessions. A service may be available to one or more system components, programs, and/or other services. In some implementations, a service may run on one or more server-computing devices.

Communication systems 62 may be configured to communicatively couple a computing machine with one or more other machines. A communication system may include wired and/or wireless communication devices compatible with one or more different communication protocols. As non-limiting examples, a communication system may be configured for communication via a wireless telephone network, or a wired or wireless local- or wide-area network. In some embodiments, a communication system may allow a computing machine to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. In a wearable machine-vision camera system subject to real-time physical deformation while worn, a method to map an environment, the method comprising:
   acquiring a series of image frames resolving one or more reference features and one or more subject features of the environment;
   locating the one or more reference features in the series of image frames;
   computing, based on the reference features as located in the series of image frames, a parameter value responsive to a real-time physical deformation of the machine-vision camera system that reorients one or more cameras of the machine-vision camera system;
   assigning coordinates to the one or more subject features based on the parameter value; and
   presenting on a display a virtual display image responsive to the coordinates of the one or more subject features.

2. The method of claim 1, wherein the machine-vision camera system is a wearable system, the method further comprising assigning coordinates to one or more of the machine-vision camera system and a wearer thereof based on the parameter value.

3. The method of claim 1, wherein the machine-vision camera system is coupled to a near-eye display projector, the method further comprising assigning coordinates to a virtual display frame of the near-eye display projector based on the parameter value.

4. The method of claim 1, wherein the parameter value is one of a plurality of parameter values responsive to the real-time physical deformation, and wherein the plurality of parameter values are computed based on the series of image frames and are used to assign coordinates to the one or more subject features.

5. The method of claim 4, wherein the parameter value is responsive to a twist of the machine-vision camera system about an axis of the machine-vision camera system.

6. The method of claim 4, wherein the parameter value is responsive to a bend of the machine-vision camera system about a fixed point on the machine-vision camera system.

7. The method of claim 1, wherein locating the one or more reference features includes locating the one or more reference features in concurrent image frames acquired by the machine-vision camera system.

8. The method of claim 1, wherein locating the one or more reference features includes locating the one or more reference features in image frames acquired at different times by the machine-vision camera system.

9. The method of claim 1, further comprising receiving output from an inertial measurement unit in the machine-vision camera system to determine an orientation of the machine-vision camera system.

10. A wearable machine-vision system subject to real-time physical deformation while worn, the machine-vision system comprising:
one or more cameras configured to acquire a series of image frames resolving one or more reference features and one or more subject features of an environment;
a binocular near-eye display projector;
a flexible, wearable rig to which the one or more cameras and near-eye display projector are fixed; and
a logic machine operatively coupled to an instruction-storage machine and configured to locate the one or more reference features in the series of image frames, compute, based on the reference features as located in the series of image frames, a parameter value responsive to a real-time physical deformation of the machine-vision system that reorients the one or more cameras of the machine-vision system, assign coordinates to the one or more subject features based on the parameter value, and present on the near-eye display projector a virtual display image responsive to the coordinates of the one or more subject features.

11. The machine-vision system of claim 10, wherein the one or more cameras include cameras with overlapping fields of view.

12. The machine-vision system of claim 10, wherein the one or more cameras include cameras oriented for stereoscopic depth imaging.

13. The machine-vision system of claim 10, wherein the one or more cameras include a camera configured for time-of-flight depth sensing.

14. The machine-vision system of claim 10, further comprising an inertial measurement unit responsive to an orientation of the machine-vision system and/or a change in position of the machine-vision system.

15. In a head-wearable machine-vision camera system subject to real-time physical deformation while worn, a method to map an environment, the method comprising:
acquiring a series of image frames resolving one or more reference features and one or more subject features of the environment, the image frames being acquired by one or more cameras arranged on a flexible rig;
locating the one or more reference features in the series of image frames;
computing, based on the reference features as located in the series of image frames, a plurality of parameter values, each responsive to an extent of a real-time physical deformation of the rig in a corresponding deformation mode, the physical deformation being such as to reorient the one or more cameras of the machine-vision camera system;
assigning coordinates to the one or more subject features based on each of the parameter values, wherein the assigned coordinates are invariant to the extent of the physical deformation;
assigning coordinates to a display componentry arranged on the flexible rig; and
presenting a virtual display image on the display componentry responsive to the coordinates of the one or more subject features and further responsive to the coordinates assigned to the display componentry.

16. The method of claim 15, wherein computing the plurality of parameter values includes computing at regular intervals during acquisition of the series of image frames.

17. The method of claim 15, wherein the parameter value is a value of a parameter in a deformation model applied to the rig, the parameter representing one or more of a twist and a bend of the rig.

* * * * *